United States Patent
Asplund et al.

(10) Patent No.: US 8,548,399 B2
(45) Date of Patent: Oct. 1, 2013

(54) ADAPTIVE ANTENNA TRANSMISSION AND ANTENNA CALIBRATION

(75) Inventors: Henrik Asplund, Stockholm (SE); Jonas Medbo, Uppsala (SE); Mathias Riback, Danderyd (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 328 days.

(21) Appl. No.: 12/665,567

(22) PCT Filed: Jun. 21, 2007

(86) PCT No.: PCT/SE2007/000612
§ 371 (c)(1),
(2), (4) Date: Dec. 18, 2009

(87) PCT Pub. No.: WO2008/156389
PCT Pub. Date: Dec. 24, 2008

(65) Prior Publication Data
US 2010/0190456 A1    Jul. 29, 2010

(51) Int. Cl.
*H03C 1/52*    (2006.01)

(52) U.S. Cl.
USPC ........ 455/106; 455/115.1; 455/101; 455/103; 455/127.1; 455/127.2

(58) Field of Classification Search
USPC .......... 455/106, 115, 101, 103, 127.1, 127.2; 343/703
See application file for complete search history.

(56) References Cited

U.S. PATENT DOCUMENTS

| | | | |
|---|---|---|---|
| 6,101,374 A * | 8/2000 | Kono | 455/115.1 |
| 6,289,216 B1 * | 9/2001 | Koh et al. | 455/424 |
| 6,392,610 B1 * | 5/2002 | Braun et al. | 343/876 |
| 7,590,395 B2 * | 9/2009 | Buckley | 455/127.1 |
| 2004/0141466 A1 | 7/2004 | Kim et al. | |
| 2005/0140546 A1 | 6/2005 | Park et al. | |
| 2006/0034382 A1 | 2/2006 | Ozluturk et al. | |

FOREIGN PATENT DOCUMENTS

| | | |
|---|---|---|
| EP | 1217779 A1 | 6/2002 |
| JP | 02-122701 | 5/1990 |

OTHER PUBLICATIONS

Smith, P. J. et al. "An Analysis of Low Complexity Algorithms for MIMO Antenna Selection." 2006 IEEE International Conference on Communications (ICC '06), vol. 3, Jun. 2006, pp. 1380-1385.

* cited by examiner

*Primary Examiner* — Sanh Phu
(74) *Attorney, Agent, or Firm* — Coats & Bennett, P.L.L.C.

(57) ABSTRACT

The present invention relates to a method for adapting transmission parameters in a transmitter $T_x$ in communication with at least one antenna 27; 38; 47; 57; 77, 88. The method comprises: transmitting a signal from the transmitter $T_x$ measuring at least one reflection coefficient $S_{11}$ of said signal for each antenna 27; 38; 47; 57; 77, 88, and adapting the transmission parameters based on the measured reflection coefficient $S_{11}$. The antenna could be a transmit antenna and/or a receive antenna. In a preferred embodiment antenna calibration may be performed by measuring propagation time for each individual transmitter chain $48_1$, $48_2$; $78_1$, $78_2$, and compensate for differences in time delay between the individual transmitter chains $48_1$, $48_2$; $78_1$, $78_2$ to assure that the signal is transmitted simultaneously from all transmit antennas.

21 Claims, 6 Drawing Sheets

ADAPTIVE ANTENNA TRANSMISSION AND ANTENNA CALIBRATION

TECHNICAL FIELD

The present invention relates to a method for adaptive antenna transmission and a method for antenna calibration.

BACKGROUND

It is well known that adapting transmission parameters to the current channel conditions improves the performance of a wireless communication system. Parameters that can be adapted are for example the power allocation, both in the frequency domain and on different antennas in a multi antenna system, as well as modulation, coding, etc.

With channel state information (CSI) at the transmitter it is possible to allocate the available power to the parts of the frequency spectrum that have good channel conditions, i.e. not waste the power on frequencies that are in deep fade for the moment. On the parts of the spectrum that have good channel conditions it is also advantageous to use higher order modulation and lower coding rate.

In future mobile systems larger bandwidths will be used and therefore broadband antennas. The gain of these broadband antennas are however not equal over the whole frequency range. In a handheld unit the gain on different frequencies will also change when the antenna interacts with the user. In a system where the CSI is reported by a receiving unit to a transmitting unit, the antenna gain will be incorporated in the reported CSI.

In systems with multiple transmit antennas it is also known that the capacity of the system is improved when the transmission parameters are adapted to the current channel conditions for each antenna. Once again not to waste power on an antenna that is in a deep fade or for some other reason have poor channel conditions.

Figure 5:
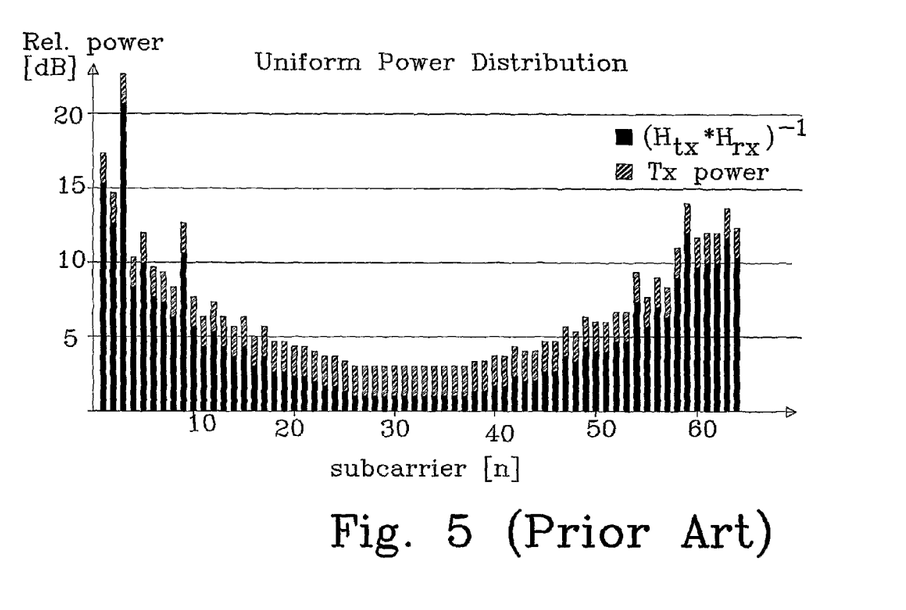
FIG. 5 shows a graph illustrating uniform power allocation in an OFDM system according to prior art.

An optimal power allocation can only be achieved when the transmitter has full CSI. Without CSI at the transmitter it is not possible to adapt to the current channel conditions at the transmitter and the best strategy is to transmit equal power, same modulation format and same coding rate over the whole frequency band and at all antennas, as illustrated in FIG. 5.

SUMMARY

An object of the present invention is to provide a method to adapt the transmission parameters of a transmitter without the need to obtain information regarding the channel condition.

By measuring the reflection coefficient(s) at the transmitter the relative antenna gain can be estimated on different frequencies and/or different antennas if more than one antenna is provided. It is then possible to adapt the transmission parameters without any CSI at the transmitter based on this frequency/antenna dependent reflection coefficient.

When measuring the reflection coefficient it is also possible to measure the propagation time from the antenna port to the actual antenna, i.e. the delay introduced by antenna feeders etc. In a system with multiple antennas it is then possible to compensate for the different time delay in the different transmitter chains, assuring that the signal is transmitted simultaneously from all antennas. It is possible to ensure that the signals will be transmitted with a known amplitude and phase. This is often called antenna calibration.

An advantage with the present invention is that an improved performance of a wireless communication system is obtained compared to not adapting power allocation, modulation format, coding rate etc., although the adaptation is not optimal.

Another advantage with the present invention is that the interaction between a user and a handheld mobile unit are taken into consideration, thus providing an improved performance.

Additional objects and advantages will become apparent for the skilled person from the detailed description of the preferred embodiments.

BRIEF DESCRIPTION OF THE DRAWINGS

FIG. 7b shows a graph illustrating power allocation between transmit antennas for the transmitter chain in FIG. 7a.

FIG. 9b shows a graph illustrating power allocation between antennas elements for the transmit antenna in FIG. 9a.

DETAILED DESCRIPTION

Figure 1:
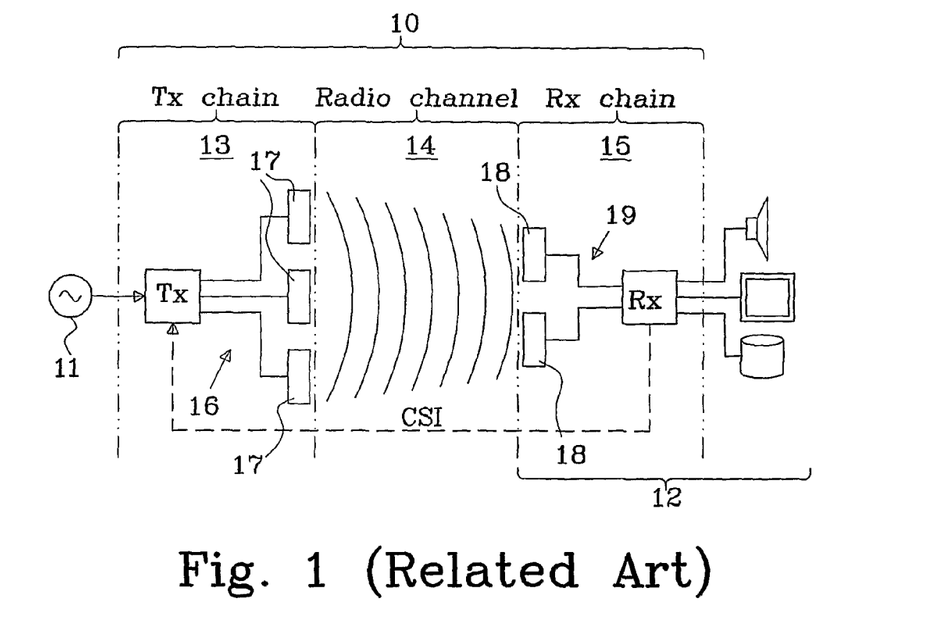
FIG. 1 shows an illustration of a communication channel.

FIG. 1 shows the different parts of a communication channel 10 interconnecting a signal source 11 and devices, such as speaker, display memory, etc. in a receiving unit 12. The communication channel 10 comprises the transmitter chain 13, the wireless radio channel 14, and the receiver chain 15. The transmitter chain 13 comprises in this example a transmitter $T_x$, a transmit distribution network 16 and three transmit antennas 17, each having one or more antenna elements (not shown). The receiver chain 15 comprises in this example two receive antennas 18, a receive distribution network 19 and a receiver $R_x$, which comprises means to process received data and forward information to the devices in the receiving unit 12.

Each transmit antenna 17 is connected to the signal source 11 via an individual transmitter chain including the transmitter $T_x$ and a part of the transmit distribution network 16. Each receive antenna 18 is connected to the receiver $R_x$ via an individual receive chain including the receiver $R_x$ and a part of the receive distribution network 19.

Traditionally, information regarding the channel condition has been determined by the receiver unit and reported back to the transmitter as indicated by the dashed line denoted CSI. The CSI includes information regarding the complete communication channel, whereby the transmitter $T_x$ adapts the transmission parameters based on the CSI.

If the transmitter chain 13 comprises multiple transmit antennas 17 and employs beam forming, or some other form of precoding, it may also be necessary to have calibrated antennas, i.e. adjust the individual transmitter chain to make sure that the signal is transmitted from the transmit antennas simultaneously and with known amplitude and phase. This is normally achieved by requesting calibration measurements reports from user equipment communicating through the transmit antennas, and thereafter estimating parameters to compensate for the RF chain impairments, as described in reference [1] and [2].

Figure 2:
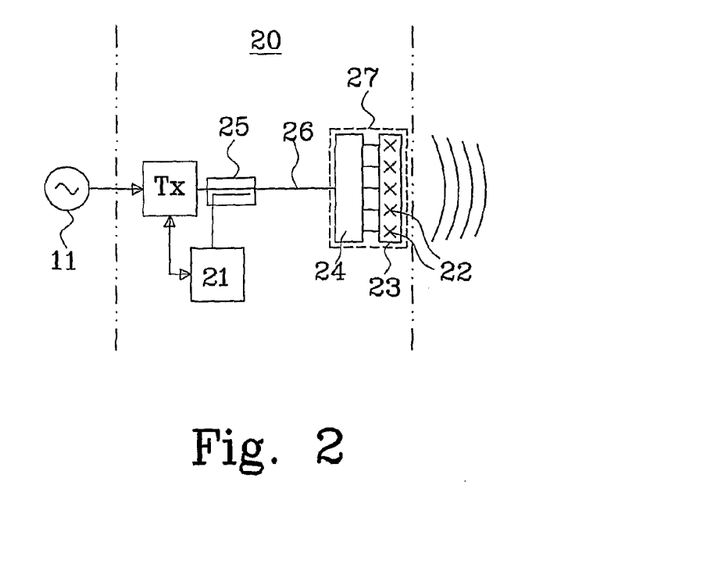
FIG. 2 shows the transmitter chain of the communication channel provided with a first embodiment of the invention implemented in the transmitter chain.

FIG. 2 shows a transmitter chain 20 of a communication channel provided with a first embodiment of an adaptation circuit 21. The transmitter chain 20 is provided with a transmitter $T_x$ connected to a signal source 11, and a distribution network 26 connected to the transmitter $T_x$ and an antenna port of one transmit antenna 27 having five antenna elements 22 arranged on an antenna panel 23. A beam forming network 24, which is integrated in the antenna 27, is supplied with a signal from the transmitter $T_x$, and is connected to each antenna element 22. The beam forming network 24 may comprise phase shifters and means to adapt the amplitude of the signal being fed to each antenna element 22. A directional coupler 25 is used to determine the reflection coefficient together with the adaptation circuit 21, which preferably comprises a receiver capable of comparing the transmitted reference signal with the reflection of the same signal—thereby calculating $S_{11}$. A system for determining the reflection coefficient is described in reference [3]. The reference signal could either be the ordinary transmission from the transmitter $T_x$, or a signal generated in the adaptation circuit and transmitted from the transmitter during idle periods of the transmitter The inventive concept relies on the ability to measure the reflection coefficient, usually denoted $S_{11}$, of a signal at each antenna using the adaptation circuit 21. $S_{11}$ is in this embodiment measured as a function of frequency, i.e. $S_{11}(f)$, and the relative antenna gain can be estimated on different frequencies based on the reflection coefficient. It is then possible to adapt the transmission parameters, without the feedback of channel state information CSI, at the transmitter based on the measured frequency dependent reflection coefficient. Only the characteristics of the $T_x$ chain 20 will be taken into consideration when adapting the transmission properties, which will result in a sub-optimal adaptation compared to the prior art adaptation with CSI. However, the sub-optimal improvement will still provide an improvement compared to not adapting power allocation, modulation format, coding rate, etc.

The reflection coefficient $S_{11}(f)$ is a measure of how much of the transmitted power that is reflected by the antenna (and other parts of the transmission chain). The power that is not reflected can be assumed to be transmitted by the antenna. Some parts will be burnt in the internal load of the antenna but the fraction of energy lost in the internal load is often small and does not have a frequency-dependence, or a very slight frequency-dependence, and will therefore not affect the optimal power allocation vs. frequency. The part of the transmit power that actually is transmitted, i.e. the transfer function, $H(f)$ can thus be expressed as:

$$|H(f)|^2 = 1 - |S_{11}(f)|^2 \qquad (1)$$

If $S_{11}(f)$ is measured at the transmitter for the Tx chain, as illustrated in FIG. 2, a sub-optimal power allocation can be calculated without any CSI at the transmitter by performing "water filling", as described in more detail below. The reflection coefficient $S_{11}$ may also be measured for the Rx chain in a similar fashion, as illustrated in connection with FIG. 3. In the following illustrative examples, the reflection coefficient for the TX chain $S_{11}^{tx}$ (continuous thin line in FIG. 4) and the relative coefficient for the Rx chain $S_{11}^{rx}$ (dotted line in FIG. 4) have been measured, and the corresponding transfer functions $H_{tx}$ and $H_{rx}$, respectively, have been calculated using equation (1) and used to illustrate the inventive concept.

Figure 3:
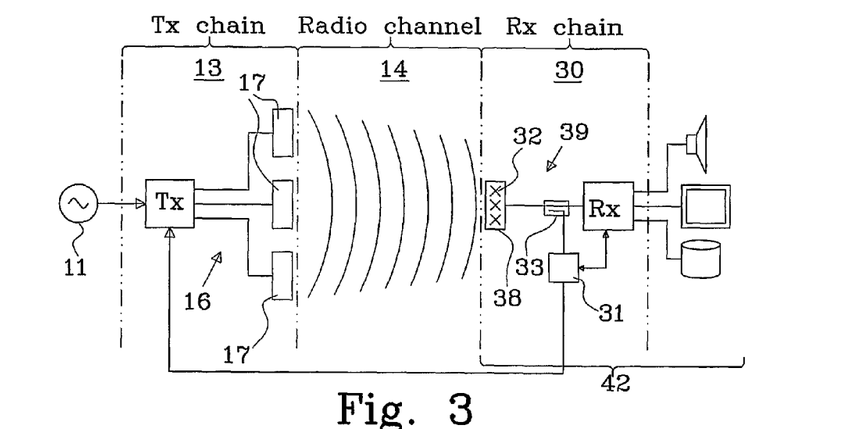
FIG. 3 shows a communication channel provided with a second embodiment of the invention implemented in the receiver chain.

FIG. 3 shows a receiver chain 30 of a communication channel provided with an adaptation circuit 31. The receiver chain 30 is provided with a receiver $R_x$ connected to devices in a receiving unit 42, and a distribution network 39 connected to the receiver $R_x$ and an antenna port of one receive antenna 38 having three antenna elements 32. A signal transmitted from the transmitter $T_x$ is received by the antenna elements 32 and forwarded to the receiver $R_x$ through the distribution network 39. A directional coupler 33 is used to determine the reflection coefficient together with the adaptation circuit 31, which preferably comprises a receiver capable of comparing the transmitted reference signal with the reflection of the same signal—thereby calculating $S_{11}$, see reference [3]. The adaptation circuit 31 generates a weak signal which is transmitted to the receiver antenna 38 and is reflected by the antenna elements 32 of the receive antenna 38, and the reflection coefficient may be determined. The weak signal generated by the adaptation circuit 31 is preferably selected to be transmitted when the receiver $R_x$ is not receiving any signals from the transmitter $T_x$, or the magnitude of the weak signal is much lower than the magnitude of the received signal to avoid distortion of the received signal and/or interference towards other units communicating on the same frequencies. In a time-division duplex (TDD) unit, measurements of the reflection coefficient(s) may be done during the time slot at which the unit is transmitting provided the receiver chain and transmitter chain are calibrated. The unit could then make use of the transmitted data as reference without the need for a special reference signal to be transmitted. The adaptation circuit 31 is, in this embodiment, arranged in the receiver unit 42, such as a base station or a mobile unit, and information regarding channel condition is signaled to the transmitter $T_x$ in order to adapt the transmission parameters accordingly. This signaling would typically require much less frequent signaling compared to full CSI feedback.

The arrangement to measure the antenna reflection coefficient(s) at the receiving unit may be useful in the case that the receiver should signal its preference for e.g. a certain frequency band (subcarrier allocation in OFDM) but does not yet have any received data upon which it can estimate the channel conditions. Such a situation could occur e.g. during random access or when pilot symbols are not transmitted across the entire available frequency band. By measuring the reflection coefficients at the receiver, the receiving unit can predict what frequencies that would be more likely to support good channel conditions. Most importantly, the use of frequencies where the receiving antenna currently is poorly matched can be avoided.

The invention will be illustrated using an OFDM (Orthogonal Frequency Division Muliplex) system since the system operates in the frequency domain. However, the invention is not limited to OFDM system and may be implemented in other telecommunication systems, such as WCDMA.

Figure 4:
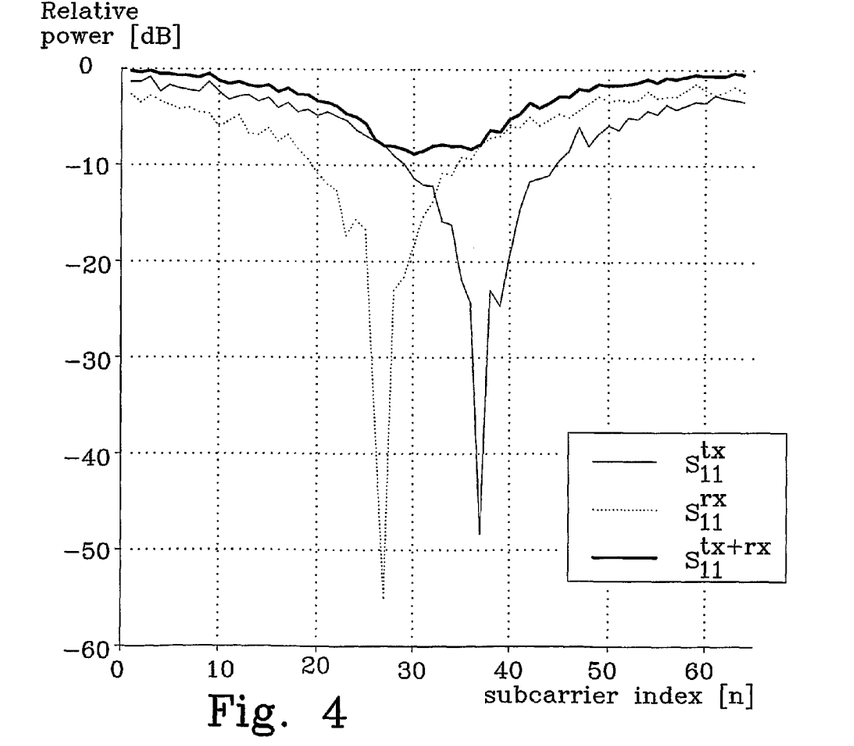
FIG. 4 shows a plot of measured reflection coefficients used in the present invention.

FIG. 4 shows a plot of reflection coefficients $S_{11}$ in relative power [dB] as a function of subcarrier index [n] of an OFDM system. A measured reflection coefficient $S_{11}{}^{tx}$, for a transmitter chain as described in connection with FIG. 2 is illustrated by a thin continuous line, and a measured reflection coefficient $S_{11}{}^{rx}$ for a receiver chain as described in connection with FIG. 3 is illustrated by a dotted line. A calculated combined reflection coefficient $|S_{11}{}^{tx+rx}|^2=1-(1-|S_{11}{}^{tx}|^2)(1-|S_{11}{}^{rx}|^2)$ is also indicated by a fat continuous line. The Relative power in FIG. 4 is in relation to transmitted power from the transmitter for $S_{11}{}^{tx}$, and in relation to incoming power to the receiver antenna for $S_{11}{}^{rx}$.

FIG. 5 shows a power allocation graph illustrating transmission parameter adaptations for an OFDM system having 64 sub-carriers, wherein each bar represents a sub-carrier. The solid part of each bar represents the inverted transfer function of both the transmitter chain and the receiver chain $(H_{tx}*H_{rx})^{-1}$. Note that the transfer function of the radio channel is omitted. A uniform power distribution has been applied according to prior art, as mentioned above. The uniform power allocation is illustrated as Tx power in the graph on top of the solid part of each bar.

Figure 6A:
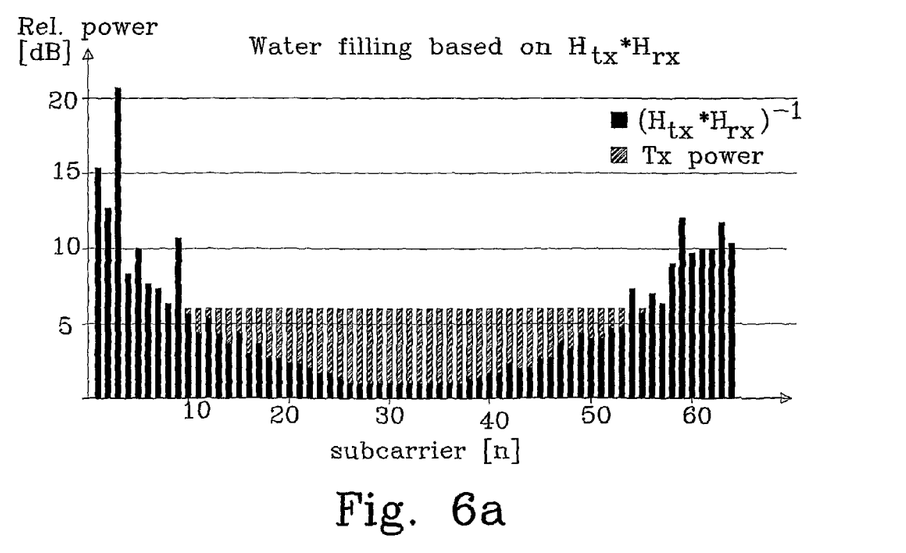
FIGS. 6a-6c show graphs illustrating power allocation in an OFDM system according to the present invention.
Figure 6B:
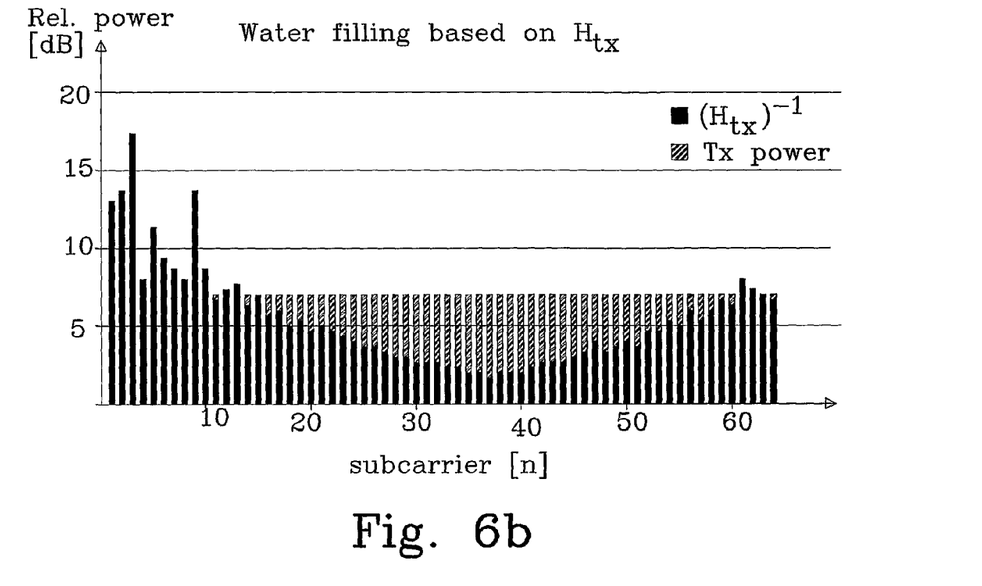
Figure 6C:
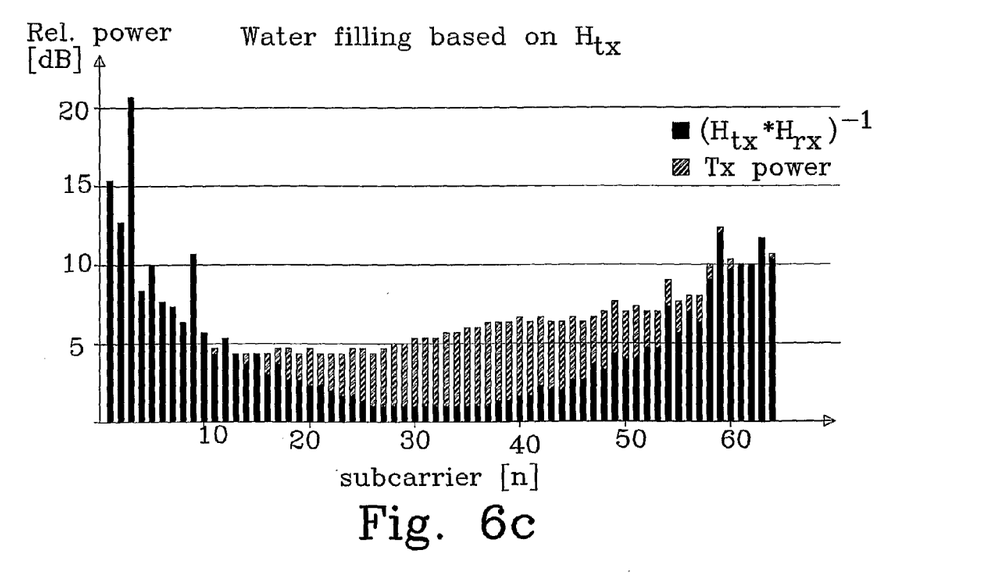

As an example, the power allocation on subcarrier n in an OFDM system with the known transmission function H(f) can be calculated as:

$$P(n) = \max\left(\lambda - \frac{1}{|H(n)|^2}, 0\right), \quad (2)$$

where $\lambda$ is chosen such that $$\sum_{0}^{N-1} P(n) = P_{tot}, \quad (3)$$

where $P_{tot}$ is the total transmit power of the transmitter $T_x$ and N is the number of subcarriers of the OFDM system. An illustration of the waterfilling concept is presented in FIGS. 6a-6c.

FIG. 6a shows a graph illustrating power allocation in an OFDM system according to the present invention, wherein the transfer function of the transmitter chain $H_{tx}$ and the transfer function of the receiver chain $H_{rx}$ are both known to an adaptation circuit, such as the system described in connection with FIG. 11.

The solid parts of each bar represent the inverted transfer function of both the transmitter chain and the receiver chain $(H_{tx}*H_{rx})^{-1}$ as described in connection with FIG. 5. "Waterfilling" has been applied to allocate Tx power to the sub-carriers n. The frequencies represented in the sub-carriers arranged between 28 and 38 are predicted to have the best conditions for the transmission, and thus most transmit power has been allocated to these sub-carriers. Frequencies represented in sub-carriers arranged below 10 and above 55 are predicted to have the worst conditions for the transmission, and therefore no transmit power has been allocated to these sub-carriers.

If the transfer function of the receiver chain is not known, an adaptation based on the transmitter chain may be performed. FIG. 6b shows a graph illustrating power allocation in an OFDM system according to the present invention, wherein only the transfer function of the transmitter chain $H_{tx}$ is known to an adaptation circuit, such as the system described in connection with FIG. 2.

The solid parts of each bar represent the inverted transfer function of the transmitter chain $(H_{tx})^{-1}$. "Waterfilling" has been applied to allocate Tx power to the sub-carriers n based on only the transmitter transfer function. The frequencies represented in the sub-carriers arranged between 33 and 41 are predicted to have the best conditions for the transmission, and thus most transmit power has been allocated to these sub-carriers. Frequencies represented in sub-carriers arranged below 14 and above 59 are predicted to have the worst conditions for the transmission, and therefore no (or very little) transmit power has been allocated to these sub-carriers.

FIG. 6c illustrates the impact of the transmit power allocation determined in FIG. 6b, based on the transfer function of the transmitter chain, in relation to the inverted transfer function of both the transmitter chain and the receiver chain $(H_{tx}*H_{rx})^{-1}$. A comparison between the prior art power distribution presented in FIG. 5 and FIG. 6c indicate that a major part of the available transmit power in the transmitter is allocated to sub-carriers having low reflection coefficients. However, it should be noted that the power allocation is not as good as the power allocation illustrated in FIG. 6a, since knowledge of the receiver reflection coefficient(s) will provide an even more improved power allocation compared to prior art (FIG. 5).

For systems with multiple transmit antennas the average transmit coefficient can be calculated for each transmit antenna. This mean value can then be used to perform waterfilling across the transmit antennas provided a first data stream is supported over a first antenna and orthogonal to a second data stream on a second antenna or for example choose which antenna to transmit on if transmit selection diversity is used. As an example the mean transfer function for transmit antenna number one $\overline{H}_{tx1}$ in an OFDM system can be calculated as $$|\overline{H}_{tx1}|^2 = \frac{1}{N}\sum_{n=0}^{N-1}|H_{tx1}[n]|^2 \quad (4)$$

If $S_{11}$ is not measured as a function of frequency but rather as the mean value over the whole frequency band this part of the invention is still applicable.

Figure 7A:
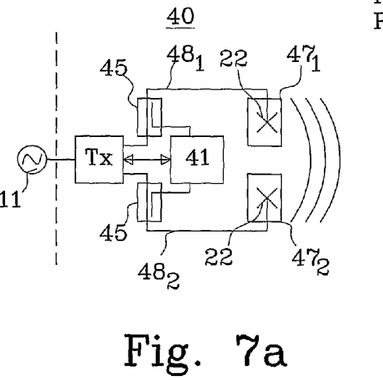
FIG. 7a shows the transmitter chain of the communication channel provided with a third embodiment of the invention implemented in the transmitter chain.

FIG. 7a shows a transmitter chain 40 of the communication channel provided with a third embodiment of the invention implemented in the transmitter chain. Antenna ports of two transmit antennas $47_1$ and $47_2$, each having a single antenna element 22 are connected to a transmitter $T_x$ using a distribution network. A signal source 11 is connected to the transmitter $T_x$ and directional couplers 45 are used to determine a reflection coefficient together with an adaptation circuit 41 for each transmit antenna $47_1$ and $47_2$ (commonly denoted as 47). The adaptation circuit 41 calculates, or measures, in this embodiment the mean value of the reflection coefficient for each antenna as mentioned above. This results in a calculated mean transfer function for each antenna. Information regarding the reflection coefficients and/or transfer functions are used to control the transmitter $T_x$ to generate the desired transmit power allocation.

Figure 7B:
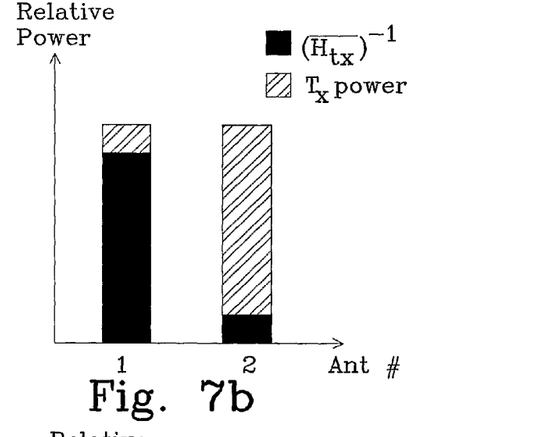

FIG. 7b shows a graph illustrating power allocation between transmit antennas $47_1$ and $47_2$ for the transmitter chain 40 in FIG. 7a. The inverse mean transfer function for each antenna is illustrated by the solid part of the bars, and waterfilling over the antennas results in the power allocation as indicated provided the datastream on each antenna is orthogonal against each other. The major portion of the transmit power is directed to antenna 2.

It should be noted that the adaptation circuit could be provided with means to select which antenna to transmit on in dependency of the measured reflection coefficient. In this example, antenna 2 should be selected and antenna 1 is not used until the measured reflection coefficients for the antennas indicate better transmission properties for antenna 1.

Figure 8A:
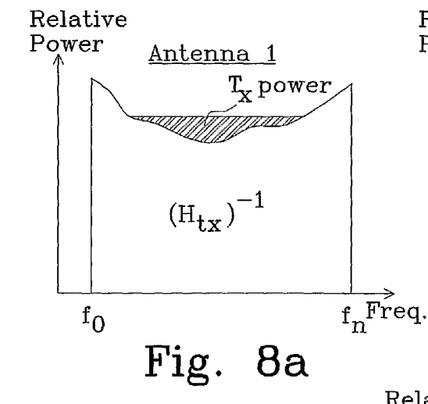
FIGS. 8a and 8b show allocation of power for each transmit antenna in FIG. 7a as a function of frequency.
Figure 8B:
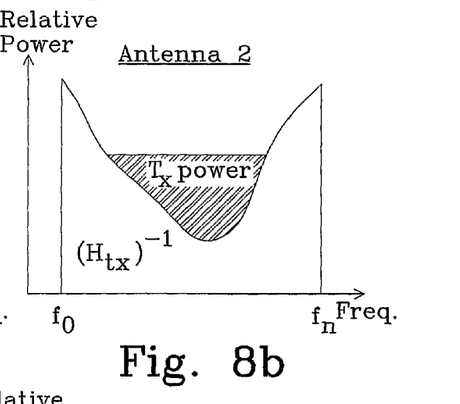

If the reflection coefficient for each antenna in FIG. 7a is measured as a function of frequency, the mean transfer function is calculated using equation (4). The power allocated to each antenna (as indicated in FIG. 7b) may be allocated across the frequency range for each antenna. This is illustrated in FIGS. 8a and 8b, which show allocation of power for each transmit antenna in FIG. 7a as a function of frequency. Waterfilling across the frequency is used in combination with waterfilling across the antennas.

Figure 9A:
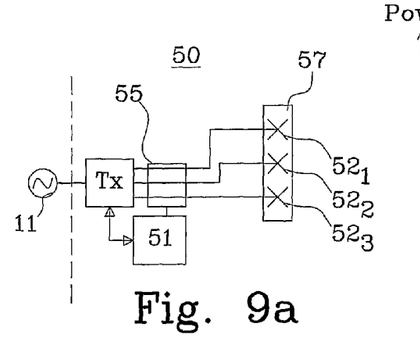
FIG. 9a shows the transmitter chain of the communication channel provided with a fourth embodiment of the invention implemented in the transmitter chain.

FIG. 9a shows a transmitter chain 50 of the communication channel provided with a fourth embodiment of the invention implemented in the transmitter chain. A transmitter $T_x$, connected to a signal source 11 supply signals to three antenna ports of an antenna 57 comprising three antenna elements $52_1$, $52_2$, $52_3$, commonly denoted 52, each connected to one of the three antenna ports. A directional coupler 55 is used to determine the reflection coefficient for each antenna element together with an adaptation circuit 51. The adaptation circuit 51 measures the reflection coefficient for each antenna element 52, either as a mean value or as a function of frequency, and calculates a transfer function for each antenna element. Information regarding reflection coefficient and/or transfer function is used to control the transmitter $T_x$ to adapt the transmission parameters, such as allocate the transmit power.

Figure 9B:
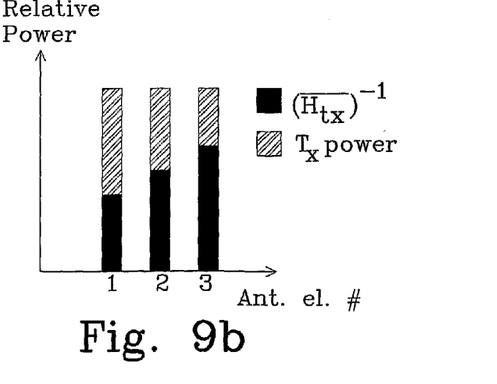

FIG. 9b shows a graph illustrating power allocation between antennas elements 52 for the transmit antenna 57 in FIG. 9a. Waterfilling across the antenna elements has been applied, but it is naturally possible to select only one or two of the antenna elements to transmit the signal from the signal source.

Figure 10:
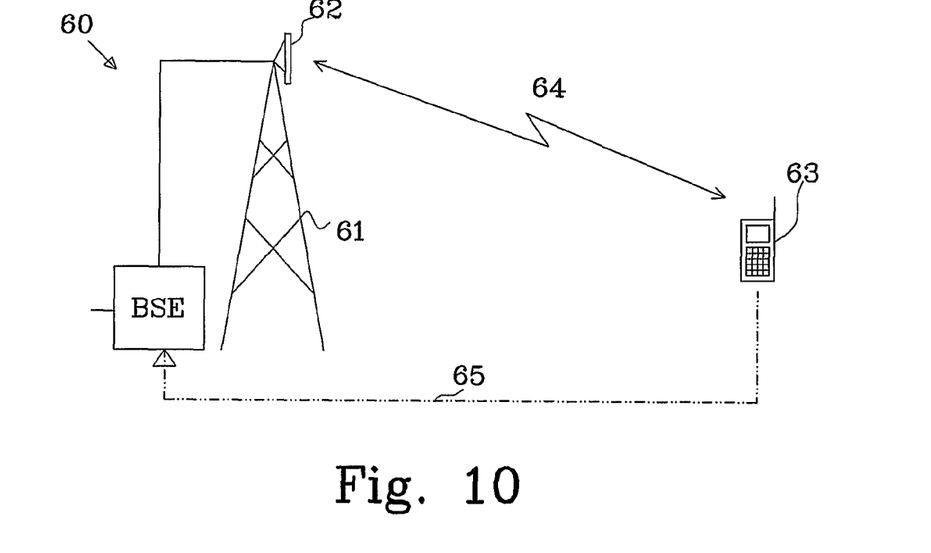
FIG. 10 shows a telecommunication system according to the present invention.

FIG. 10 shows a telecommunication system according to the present invention. A base station 60 including an antenna tower 61 provided with a base station antenna arrangement 62, and base station equipment BSE, which includes transmitter, receiver, and adaptation circuit as described in the preferred embodiments. A mobile unit 63 is within the coverage area of the base station and communicates with the BSE via the base station antenna arrangement 62 as indicated by 64. Furthermore, an optional signal 65 may be transmitted from the mobile unit 63 to the BSE if the mobile unit is equipped with the resources to measure the reflection coefficient of the receive chain as described in connection with FIGS. 3 and 11.

Figure 11:
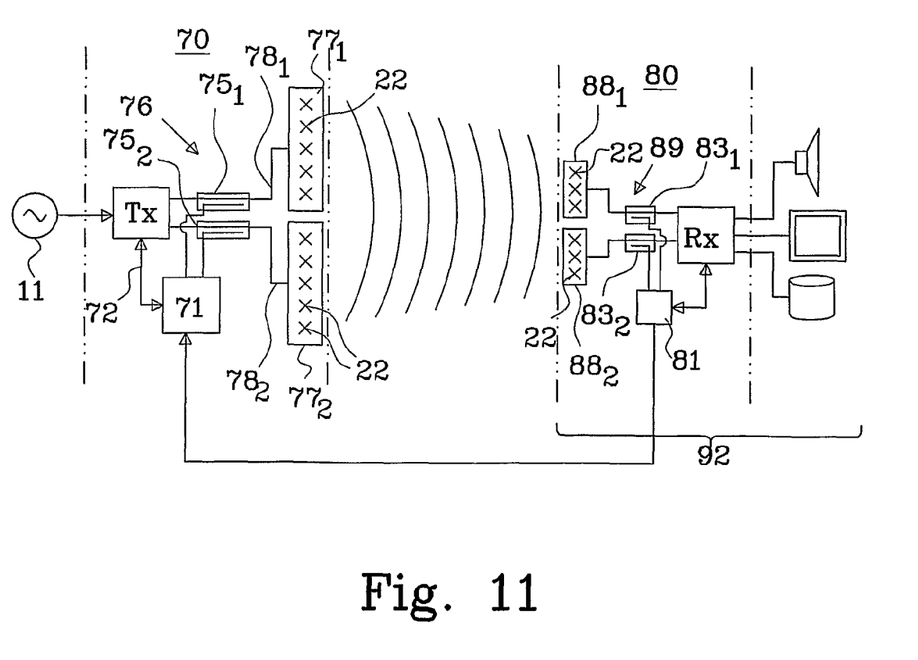
FIG. 11 shows a communication channel provided with a fifth embodiment of the invention implemented in the receiver chain and in the transmitter chain.

FIG. 11 shows a communication channel provided with a fifth embodiment of the invention implemented in the transmitter chain 70 and in the receiver chain 80.

The transmitter chain 70 comprises in this embodiment a transmitter $T_x$, connected to a signal source 11, and feeding signals to antenna ports of two antennas $77_1$ and $77_2$ (commonly denoted 77) through a distribution network 76. Each antenna is provided with five antenna elements 22. Directional couplers $75_1$ and $75_2$ are used together with an adaptation circuit 71 to determine the reflection coefficient $S_{11}$ for each antenna $77_1$, $77_2$, each having an individual transmit chain. The adaptation circuit 71 may be configured to calculate a signal indicative of suitable transmit power allocation, beamforming weights, modulation, coding, etc which is forwarded to the transmitter, as indicated by connection 72 based on the determined reflection coefficient for the transmit chain 70 and the determined reflection coefficient for the receive chain 80.

The receiver chain 80 comprises in this embodiment a receiver $R_x$ that receives signals from antenna ports of two receive antennas $88_1$ and $88_2$ (commonly denoted 88) through a distribution network 89. Each antenna is provided with three antenna elements 22. Directional couplers $83_1$ and $83_2$ are used together with a circuit 81 to determine the reflection coefficient(s) for each receiver chain. The circuit may be configured to calculate the transfer function(s) $H_{rx}$ based on the determined reflection coefficient(s) and thereafter transmit information regarding channel condition back to the adaptation circuit 71 in a suitable way, e.g. wireless signaling over the radio channel. The receiver is connected to devices in a receiving unit 92.

As an example, the effect of waterfilling of the available transmit power is illustrated in connection with FIG. 6a as described earlier. Other types of suitable transmit power allocation, beamforming weights, antenna selection, modulation and coding may be performed as a result of the calculated transfer function for both the transmitter chain 70 and the receiver chain 80.

The transmitter chain described in connection with FIGS. 2, 7a, 9a and 11 may be implemented in a base station and/or a mobile unit in a communication system as illustrated in connection with FIG. 10. The receiver chain described in connection with FIGS. 3 and 11 may also be implemented in a base station and/or a mobile unit in a communication system as illustrated in connection with FIG. 10.

The needed update rate for the $S_{11}$ measurements is different for a mobile unit and a base station. At the base station $S_{11}$ is not likely changed at a high rate and therefore the measurements can be updated at a slow rate. This is because the connections to the antenna and the environment around the antenna are almost static. At the mobile unit, on the other hand, $S_{11}$ change rather fast as the user interacts with the antenna. Therefore $S_{11}$ measurements have to be updated at a higher rate. A typical update rate at the mobile unit is once per second, or higher.

Calibration

In a system with multiple transmit antennas, such as described in connection with FIGS. 7a and 11, it is possible to perform antenna calibration with or without the adaptation of the transmission parameters based on the measured reflection coefficient $S_{11}$ as described earlier. The antenna calibration is performed by compensating for the different time delay in the available transmitter chains, in order to assure that the signal is transmitted simultaneously from all antennas, and also to ensure that the amplitude and the phase on each antenna is equal or at least known. If the system employs beamforming or some other form of precoding it is sometimes necessary to have calibrated antennas. The present invention provides means to perform antenna calibration without any feedback from the receiver.

The different time delays are determined by measuring the propagation time from the antenna port to the actual antenna, i.e. the delay introduced by antenna feeders etc. This time delay may be deduced from the $S_{11}(f)$ measure by e.g. performing an inverse Fourier transform of $S_{11}(f)$ giving an equivalent impulse response $s_{11}(\tau)$. The time delay $\tau_{peak}$ is visible as a peak in $s_{11}(\tau)$ that will correspond to the propagation delay from the transmitter Tx to the reflection point at the antenna and back to the adaptation circuit 71. From this delay the time delay from the transmitter to the antenna may be determined by dividing $\tau_{peak}$ by 2. The measurement is performed on the individual transmitter chain for each antenna, as described in more detail below.

In FIG. 7a, each transmit antenna $47_1$ and $47_2$ receives a signal from the transmitter $T_x$ via an individual transmitter chain $48_1$ and $48_2$, respectively. The adaptation circuit 41 may be configured to only measure the propagation time for each transmitter chain $48_1$ and $48_2$, or it may be configured to measure the propagation time together with the functionality to determine the reflection coefficients of each transmit antenna $47_1$ and $47_2$.

In FIG. 11, each transmit antenna $77_1$ and $77_2$ receives a signal from the transmitter $T_x$ via an individual transmitter chain $78_1$ and $78_2$, respectively. The adaptation circuit 71 may be configured to only measure the propagation time for each transmitter chain $78_1$ and $78_2$, and also be configured to receive information regarding reflection coefficients) and/or channel condition from the circuit 81 in the receiver chain 80 to adapt the transmission parameters only based on the determined transfer function $H_{rx}$ of the receiver chain. However, it is also possible to configure the adaptation circuit 71 to measure the propagation time together with the functionality to determine the reflection coefficients of each transmit antenna $77_1$ and $77_2$.

The main advantage of the invention is the possibility to adapt the transmission parameters, such as antenna selection, power allocation, beamforming weights, modulation and coding rate, without any CSI at the transmitter. The adaptation will be suboptimal but nevertheless provide an improvement over the traditional equal power/modulation/coding rate allocation. In a handheld unit the antenna gain on different antennas and on different frequencies will change as the user interacts with the antennas. With this invention these effects are taken into consideration in the waterfilling solution.

For systems with multiple transmit antennas it is possible to adapt the transmission parameters across the transmit antennas without CSI at the transmitter. This is particularly useful at the mobile station since one can avoid transmitting on an antenna that is attenuated by the user. As the interaction between a user and the mobile station antenna easily can result in more than 10 dB attenuation significant gains can be achieved.

If the transfer function of the receive chain is not available to the adaptation circuit in the transmitter unit when transmission parameters are adapted, a default transfer function $H_{rx}^{default}$ of the receive chain may be used in combination with the transfer function $H_{tx}$ of the transmitter chain. The default transfer function is preferably stored in the adaptation circuit and is preferably established based on a number of measured reflection coefficients from standard receiver units. This is most useful when the variations in reflection characteristics among different units are expected to be limited.

It is even possible to implement the present invention in a system using CSI to adapt the transmission parameters. The information regarding the transfer function of the transmitter chain may be used in the time period between the updated CSI is received by the transmitter unit since the changes of the transfer function in the transmitter normally are faster than the CSI has a possibility to forward to the transmitter.

The described embodiments have illustrated the invention to emphasize certain aspects, and it should be noted that it is obvious for a skilled person in the art to combine them to obtain a desired functionality.

The relative power used on the y-axis in FIGS. 5, 6a-6c, 7b, 8a-8b, and 9b should be considered to be in relation to a fictitious power level used to illustrate the relative power levels between sub-carriers, antennas, or frequencies.

| Abbreviations | |
|---|---|
| CSI | Channel State Information |
| $H_{tx}$, $H_{rx}$ | Transfer function for Tx chain and Rx chain |
| OFDM | Orthogonal Frequency Division Multiplex |
| $R_x$ | Receiver |
| $S_{11}$ | Reflection Coefficient |
| $T_x$ | Transmitter |
| WCDMA | Wideband Code Division Multiple Access |

REFERENCES 1. 3GGP R1-071048, "The Need for Measurement Report Mechanism Supporting NodeB RF Front End Calibration", Ericsson.
2. 3GGP R1-071602, "Absence of Array Calibration—Impact on Precoding Performance", Ericsson.
3. Agilent AN 1287-2, "Exploring the Architectures of Network Analyzers", Agilent Technologies.

The invention claimed is:

1. A method for adapting transmission parameters in a transmitter in communication with at least one antenna, said method comprising:
    transmitting a signal from the transmitter;
    determining at least one reflection coefficient of said signal for each antenna by comparing the transmitted signal with a reflection of the same signal, which at least one reflection coefficient is a measure of the transmitted power reflected by each antenna; and
    adapting one or more of the following: power allocation among carriers, beamforming weights, modulation, or coding based on the determined reflection coefficient.

2. The method of claim 1, wherein said reflection coefficient is determined as a function of frequency.

3. The method of claim 2, wherein the at least one antenna is selected to be at least one transmit antenna to which said transmitter is connected, said reflection coefficient is determined for each transmit antenna and the adaptation of transmission parameters comprises waterfilling across the at least one transmit antenna to calculate power allocation in frequency.

4. The method of claim 2, wherein the at least one antenna is selected to be at least one receive antenna in a receiving unit, said method further comprises:
    determining at least one reflection coefficient of a weak signal transmitted to the at least one receiver antenna by comparing the transmitted weak signal with a reflection of the same weak signal in the receiving unit;
    predicting channel conditions from the transmitter to the receiver based on the determined at least one reflection coefficient in the receiving unit; and
    signaling information regarding reflection coefficients to the transmitter in order to adapt the transmission parameters.

5. The method of claim 1, wherein the at least one antenna is selected to be a multiple transmit antenna to which said transmitter is connected, and said reflection coefficient for each transmit antenna is determined as an average value over a frequency band.

6. The method of claim 1, wherein the at least one antenna is selected to be multiple transmit antennas to which said transmitter is connected, and wherein the method further comprises:

determining a time delay based on reflection of the signal transmitted from the transmitter for each individual transmitter chain; and compensating for differences in time delay between the individual transmitter chains to assure that the signal is transmitted simultaneously from all transmit antennas.

7. A method for calibrating a transmit system having multiple transmit antennas connected to a transmitter, said method comprising:

transmitting a signal from the transmitter to each transmit antenna via an individual transmitter chain;

determining a time delay based on reflection of the signal transmitted from the transmitter for each individual transmitter chain, said signal is reflected by each transmit antenna; and compensating for differences in time delay between the individual transmitter chains to assure that the signal is transmitted simultaneously from all transmit antennas.

8. The method of claim 7, wherein the determination of the time delay comprises:

measuring propagation time for each individual transmitter chain; and calculating time delay for each individual transmitter chain based on the measured propagation time.

9. The method of claim 7, wherein said transmit system is selected to be arranged in a base station or a mobile unit in a wireless communication system.

10. A node comprising at least one antenna and a transmitter, said node being configured to determine at least one reflection coefficient of a signal for each antenna, said signal being transmitted from the transmitter, and said node further comprising:

an adaptation circuit configured to adapt one or more of the following: power allocation among carriers, beamforming weights, modulation, or coding in said transmitter based on the at least one reflection coefficient determined by comparing the transmitted signal with a reflection of the same signal, which at least one reflection coefficient is a measure of the transmitted power reflected by each antenna.

11. The node of claim 10, wherein said adaptation circuit is configured to determine the reflection coefficient as a function of frequency.

12. The node of claim 10, wherein the at least one antenna comprises at least one transmit antenna connected to the transmitter, and wherein the node is configured to determine the reflection coefficient for each of the at least one transmit antenna, and the adaptation circuit is configured to adapt the transmission parameters by waterfilling across the at least one transmit antenna to calculate power allocation in frequency.

13. The node of claim 10, wherein the at least one antenna comprises multiple transmit antennas connected to said transmitter, and wherein said node is configured to determine the reflection coefficient for each transmit antenna as an average value over a frequency band.

14. The node of claim 10, wherein the at least one antenna comprises at least one receive antenna connected to the transmitter, and wherein the node includes a receiving unit configured to determine at least one reflection coefficient of a weak signal transmitted to the at least one receive antenna, by comparing the transmitted weak signal with a reflection of the same weak signal, predict channel conditions from the transmitter to the receiving unit based on the determined reflection coefficients, and signal information regarding channel conditions to the transmitter in order to adapt the transmission parameters.

15. The node of claim 10, wherein the transmitter is connected to multiple transmit antennas, and the node is further configured to measure propagation time in each individual transmitter chain, and calculate time delay, to compensate for differences in time delays between the individual transmitter chains.

16. The node of claim 10, wherein said node is configured to regularly update the reflection coefficient as measured.

17. The node of claim 10, wherein the node is a base station.

18. The node of claim 10, wherein the node is a mobile unit.

19. A node comprising a transmitter connected to multiple transmit antennas, wherein said node is configured to transmit a signal from the transmitter to each transmit antenna via an individual transmitter chain, and is further configured to:

determine a time delay based on reflection of the signal transmitted from the transmitter for each individual transmitter chain, said signal is reflected by each transmit antenna; and compensate for differences in time delays between the individual transmitter chains, to assure that the signal is transmitted simultaneously from all transmit antennas.

20. The node of claim 19, wherein said node includes an adaptation circuit for determining the time delay, and wherein said adaptation circuit is configured to:

measure propagation time for each individual transmitter chain from antenna port in the transmitter to each transmit antenna; and calculate time delay for each individual transmitter chain based on the measured propagation time.

21. The node of claim 19, wherein the node is a base station or a mobile unit in a wireless communication system.

* * * * *